(12) United States Patent
Bekkevold

(10) Patent No.: US 8,875,364 B2
(45) Date of Patent: Nov. 4, 2014

(54) INSULATED PIPE COUPLING

(75) Inventor: Knut Håvard Bekkevold, Hof (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 1263 days.

(21) Appl. No.: 12/735,191

(22) PCT Filed: Sep. 16, 2008

(86) PCT No.: PCT/NO2008/000331
§ 371 (c)(1),
(2), (4) Date: Nov. 4, 2010

(87) PCT Pub. No.: WO2009/038469
PCT Pub. Date: Mar. 26, 2009

(65) Prior Publication Data
US 2011/0049876 A1    Mar. 3, 2011

(30) Foreign Application Priority Data

Sep. 21, 2007  (NO) .................................. 20074818

(51) Int. Cl.
*B23P 19/04*  (2006.01)
*F16L 59/18*  (2006.01)
*F16L 1/26*   (2006.01)

(52) U.S. Cl.
CPC  *F16L 59/188* (2013.01); *F16L 1/26* (2013.01)
USPC ............................................ 29/237; 29/238

(58) Field of Classification Search
USPC .............. 29/237, 238, 239, 243.55, 270, 278; 269/43, 45, 3, 6
See application file for complete search history.

(56) References Cited

U.S. PATENT DOCUMENTS

| 2,453,480 | A  |   | 11/1948 | Williamson et al. |
| 3,845,974 | A  |   | 11/1974 | Pelloux-Gervais |
| 4,091,514 | A  | * | 5/1978  | Motes-Conners et al. ..... 29/33 T |
| 5,694,670 | A  | * | 12/1997 | Hosseinian et al. ............ 29/237 |
| 5,743,131 | A  | * | 4/1998  | Holliday et al. ............. 72/409.1 |
| 6,889,770 | B2 |   | 5/2005  | Qvam et al. |
| 7,043,806 | B2 | * | 5/2006  | Schrock et al. ................ 29/237 |
| 2002/0042979 | A1 | * | 4/2002 | Ishida et al. .................... 29/237 |
| 2003/0168857 | A1 |   | 9/2003 | Jennings |
| 2004/0143946 | A1 | * | 7/2004 | Sullivan et al. ................ 29/268 |
| 2004/0178626 | A1 |   | 9/2004 | Segreto |
| 2011/0049876 | A1 | * | 3/2011 | Bekkevold .................... 285/363 |
| 2013/0086782 | A1 | * | 4/2013 | Dewell ............................ 29/237 |
| 2013/0277960 | A1 | * | 10/2013 | Neal et al. ..................... 285/93 |

FOREIGN PATENT DOCUMENTS

| GB | 1 314 816 | 4/1973 |
| GB | 2 296 749 A | 7/1996 |
| WO | WO 03/048512 A1 | 6/2003 |
| WO | WO 2004/018825 A2 | 3/2004 |

* cited by examiner

Primary Examiner — Lee D Wilson

(57) ABSTRACT

A pipe coupling apparatus for coupling together first and second opposing pipe flanges includes a number of gripping elements which are connected to the second pipe flange and are engageable with the first pipe flange. A locking element is displaceably arranged on the second pipe flange to lock the gripping elements to the first pipe flange when the pipe flanges are coupled together, and an insulating element extends around the second pipe flange and is connected to the locking element. The apparatus includes an actuating tool for displacing the first insulating element and thus the locking element.

12 Claims, 4 Drawing Sheets

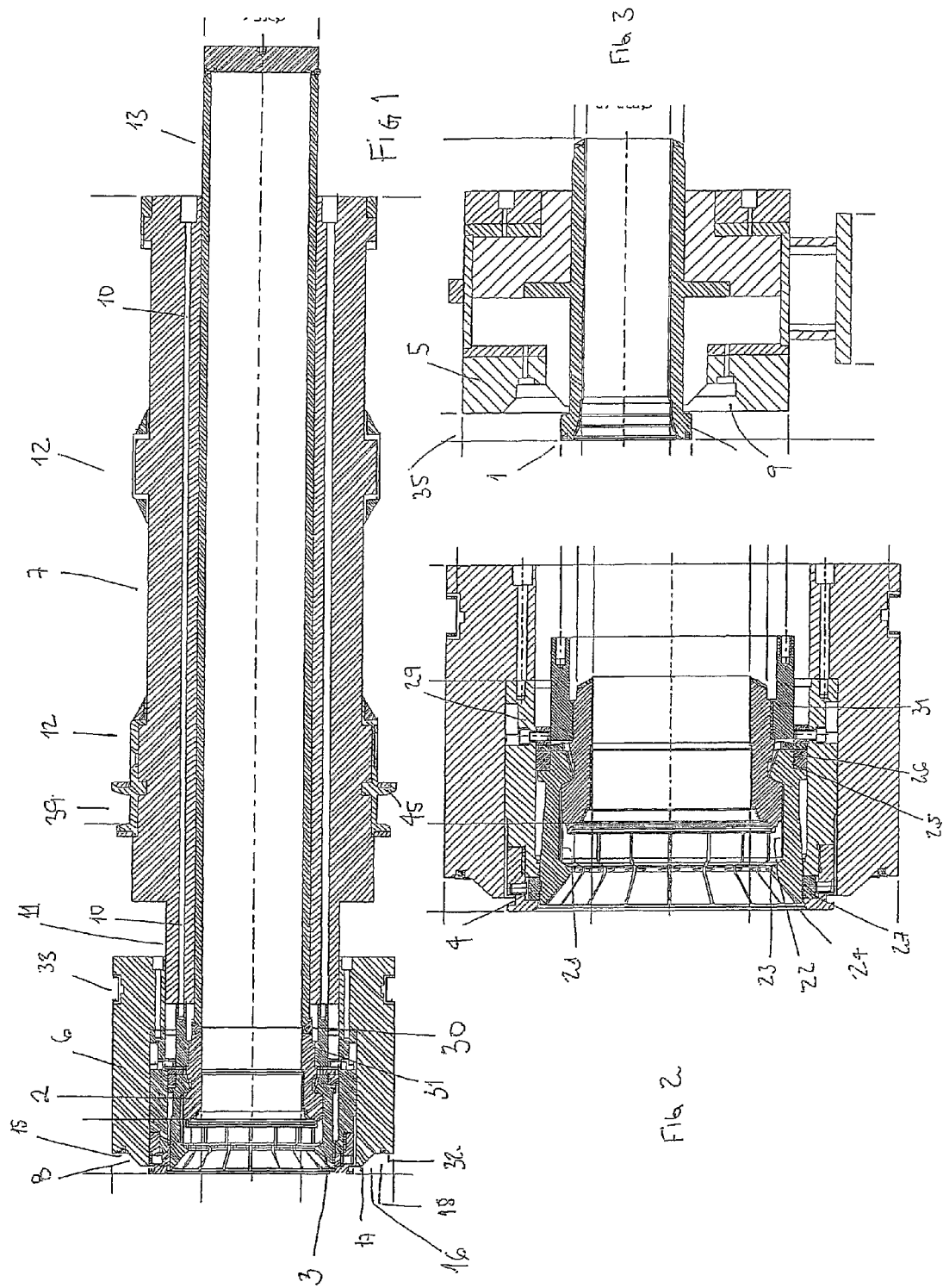

INSULATED PIPE COUPLING

BACKGROUND OF THE INVENTION

The present invention relates to a coupling that is insulated and that is used to couple together two opposing (pipe) flanges, which insulated pipe coupling comprises gripping and retaining elements for locking and securing the flanges when they are coupled together, wherein the insulating elements are connected to the flanges. Furthermore, the invention also relates to a pipe coupling apparatus comprising two pipe flanges and at least one pipe, as well as means for coupling together the two pipe flanges, wherein at least one of the pipe flanges is connected to a pipe.

In connection with different types of operations that are carried out during the offshore production of hydrocarbons, it will be necessary, for various reasons, to be able to connect and disconnect the equipment used. This may, for example, be the case for different equipment that is placed on the seabed, where components such as manifolds, pumps, pressure tanks etc. are connected via pipes and couplings, either to each other in a closed system, or also to one or more floating or fixed installations.

A pipe coupling that can be used in connection with aforementioned operations and/or conditions is described in NO 314 422. The pipe coupling is used to clamp together two pipe flanges and comprises fingers that are arranged along the periphery of the pipe flanges. When the pipe coupling is closed, the fingers are held in a locked position by means of a sliding ring which lies on the outside of the fingers. The sliding ring is moved in the longitudinal direction of the fingers by means of an actuator, which actuator may be arranged in the coupling itself or it may be arranged on an external subsea tool, for example, a remote-operated subsea vehicle (ROV).

In addition to the above loads, the deployed equipment, because of the depth or the waters in which it is deployed, will be exposed to seawater that is just a couple of degrees above freezing point. If the well, for example, is choked or closed off temporarily, the hydrocarbons that are in the tubing will be cooled to temperatures as low as the temperatures of the water, which may lead to hydrate formation in the equipment. This can result in the flow through the tubing being blocked or in the equipment being damaged.

To prevent hydrate formation in subsea equipment, U.S. Pat. No. 6,889,770 proposes a method and an apparatus which insulate subsea installations, this being done by encompassing the subsea installation in a housing. The actual installation of the housing is carried out in several steps and requires the use of divers, special equipment etc. During maintenance operations or the replacement of equipment or components that are within the housing, the housing must be removed from the subsea installation, the necessary maintenance and/or replacement carried out, after which the housing must be mounted in place again.

Furthermore, from US 2003/0168857, GB 1314816, GB 2296749 and US 2004/0178626 there are known different types of couplings which employ fingers that lock around opposing flanges.

One of the objects of the present invention will therefore be to provide an insulated pipe coupling, where the insulation that is arranged around the coupling is less complicated to install, and makes the coupling process easier.

Another object of the present invention is to provide a pipe coupling where the insulation takes up forces and/or loads to which the pipe coupling is subjected, particularly during installation.

Yet another object of the present invention is to provide an insulated pipe coupling that prevents hydrate formation in the insulated areas.

Still another object of the present invention is to provide an insulated pipe coupling where the insulation is mounted on the pipes before they are lowered to the seabed.

Yet another object of the present invention is to provide an insulated pipe coupling where the insulation protects the pipe flanges and an area around them from impacts, knocks or the like.

Still another object of the present invention is to provide an insulated pipe coupling, which coupling safely secures the coupled components.

Yet another object of the present invention is to provide a pipe coupling which can be operated, that is to say, both coupled and released, by a subsea vessel, for example, a ROV.

SUMMARY OF THE INVENTION

Accordingly, the present invention relates to a pipe coupling apparatus for coupling together two opposing pipe flanges. The pipe coupling comprises one or more gripping elements that are connected to a second pipe flange. The gripping elements are provided for locking with a first pipe flange. To ensure that the gripping elements are not unintentionally released when the pipe coupling is subjected to bending and/or tensile stresses, there is provided, in connection with the pipe coupling gripping elements, at least one locking element which is displaceably arranged in the axial direction of the second pipe flange, for locking the gripping elements to the first pipe flange when the pipe flanges are coupled together. The locking element is fixedly connected to at least one insulating element, preferably a first insulating element, which surrounds the pipe flange, and the apparatus comprises a tool that is designed to displace the first insulating element and thus the locking ring. The tool may comprise a first part that is connected to the first insulating element and a second part that is connected to a second insulating element, the two parts being connected to an actuator.

Furthermore, the present invention relates to a pipe coupling apparatus comprising two pipe flanges and at least one pipe. The apparatus also includes means for coupling together the two pipe flanges, wherein at least one of the pipe flanges is connected to a pipe. At least the pipe is surrounded by at least one insulating element which has load-bearing and force-transmitting properties. The insulating element arranged around the pipe is prepared for the attachment of an actuating tool.

Moreover, the present invention relates to a pipe coupling apparatus comprising two pipe flanges and at least one pipe. The apparatus also includes means for coupling together the two pipe flanges, wherein at least one of the pipe flanges is connected to a pipe. At least the pipe is surrounded by at least one insulating element that has load-bearing and force-transmitting properties. The insulating element arranged around the pipe comprises means for the attachment of the pipe to a structure, preferably a seabed structure.

The pipe coupling apparatus comprises at least one insulating element, but in one embodiment comprises a plurality of insulating elements which may have the same or different form and extent, for example, a first, second and/or third insulating element. The insulating elements will be configured and arranged to the pipe flanges in such manner that, in addition to preventing hydrate formation, they will also protect the pipe coupling from impacts, knocks or loads to which the coupling is subjected during installation and use, and so that they will be able to take up forces and/or loads to which the pipe coupling is subjected during coupling and uncoupling.

These insulating elements may be arranged and connected to each of the pipe flanges. If one or both of the pipe flanges is connected to, for example, a pipe, an additional longitudinal insulating element can be arranged around the pipe and connected to the insulating element that is connected to the pipe flange, the elongate insulating element thereby extending over a length of the pipe. The insulating elements that are connected to the pipe flanges are, on the sides facing each other, further configured with complementary faces. When the pipe flanges are coupled together, the insulating elements will form a "continuous" element that will seal against heat loss through convection.

The insulating elements may be made of any suitable material, which material, for example, may have properties that give low thermal conductivity, and be such that it maintains its insulating and mechanical properties under hydrostatic compression, that it does not let in/take up water under high pressure, that it is flexible and resistant to knocks and impacts, that it has good adherence to the surface that is to be insulated/protected etc. The insulating elements may further be made as separate elements that are mounted on the article to be protected. The insulating elements can also, with the aid of suitable methods, be moulded on the article to be protected.

To allow the locking element to be movable in the axial direction of the pipe, the insulating element that is arranged around the flange comprising the locking element is fixedly connected to the locking element and movably arranged relative to the elongate insulating element. This is achieved in that the elongate element, at its end facing the insulating element arranged on the pipe flange, is configured with a smaller diameter over a part of the element's length and is also fixedly connected to a sleeve element which is fixedly arranged to the pipe flange, so that the insulating element that is connected to the locking element can be displaced in the axial direction of the pipe when the pipe coupling is coupled or uncoupled.

The elongate insulating element that is arranged around the pipe which is connected to one of the pipe flanges is, on its outer surface, further equipped with reinforced portions in the form or ribs or the like which cooperate with sleeve elements arranged on a mounting device. The elongate insulating element further comprises one or more recesses which form support for an actuating tool, the recesses also being arranged in the insulating element that is connected to the locking element.

When coupling or uncoupling the pipe coupling, the actuating tool will thus be arranged so that it comes to bear against the recesses in the two insulating elements. With the aid of a piston, the insulating element that is fixedly connected to the locking element will move the locking element into abutment with the gripping elements, whereby a locking of the pipe coupling is obtained, or the insulating element will move the locking element away from the gripping elements, whereby an uncoupling of the pipe coupling is obtained.

The insulating elements are fastened to respective parts by suitable fastening devices such as bolts, quick release couplings, threads, adhesive etc., this being done on an installation before the pipe coupling is lowered to the seabed.

The insulated pipe coupling will thus be a coupling where the forces and/or loads to which the pipe coupling is subjected during coupling and uncoupling are not only taken up by the pipe flanges and the associated gripping and retaining elements, but also by the insulating elements that are arranged around the pipe coupling.

The insulating elements may be made of any suitable material which provides an insulating effect and which at the same time will be capable of taking up the forces that occur during installation and connection. The different elements may thus also be made of different materials.

The insulating elements are, in a preferred embodiment, made in one piece, but it may also be desirable to make them in several pieces, for example, two cylindrical halves, which in a suitable way may subsequently be connected to pipe flanges, pipes etc.

BRIEF DESCRIPTION OF THE DRAWINGS

Further objects, structural embodiments and advantages of the invention will be apparent on studying the detailed description and the drawings, wherein:

FIG. 1 shows a longitudinal section through a second pipe flange, pipe coupling and pipe according to the present invention;

FIG. 2 shows details of the second pipe flange and the pipe coupling;

FIG. 3 shows a first pipe flange and the pipe coupling;

DETAILED DESCRIPTION OF THE INVENTION

Figure 4:
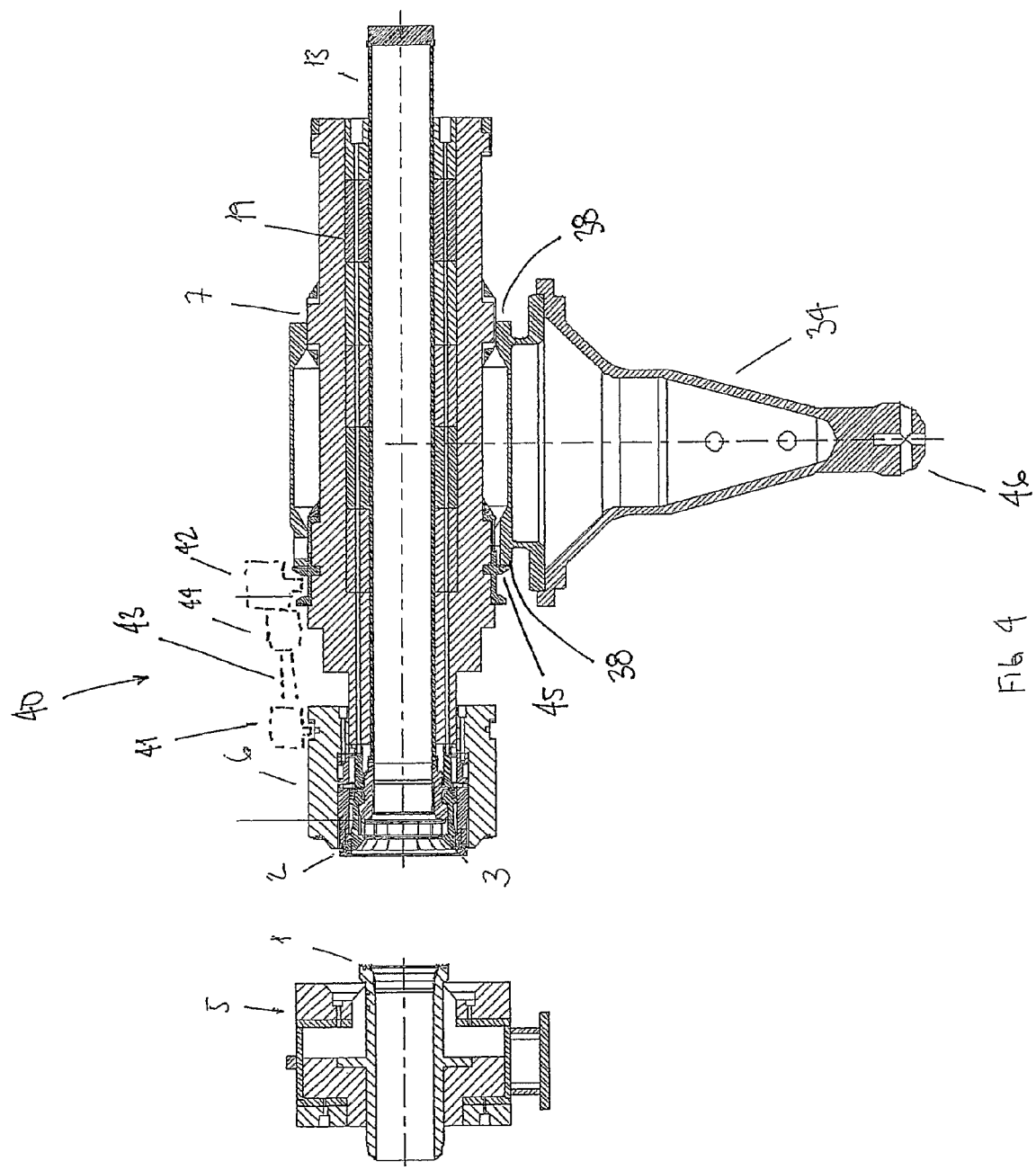
FIG. 4 shows the pipe coupling provided and ready to be coupled together.

FIGS. 1 and 2 show a termination head which constitutes an end termination for a pipeline, umbilical, cable or the like that is provided to be connected to a stationary structure on the seabed. It comprises a pipe flange 2 which via a weld 30 is connected to a pipe 13. One or more gripping elements 3 are arranged on the pipe flange 2, which gripping elements 3 may, for example, be fingers that are arranged around the periphery of the second pipe flange 2. The fingers run parallel to the axial direction of the pipe 13.

The fingers 3 are arranged loosely around the periphery of the second pipe flange 2, but are held in their positions by surrounding elements. In addition, non-illustrated guides, which may, for example, be pins in the fingers, will ensure that the fingers do not twist about radial axes.

To obtain a locking on the coupling together of two opposing pipe flanges 1, 2, the fingers 3, on one side that is to rest against a first pipe flange 1 (shown in FIG. 2), are configured with depressions 21 which essentially correspond to the shape of the flanges 1, 2 themselves. The depressions 21 are defined by a bottom face 22 and slanting inner and outer side faces 23, 24. The opposite sides of the fingers (the outer side), that is to say, the side facing away from the pipe flanges 1, 2, are at one end configured with a recess 25, in which recess 25 is arranged a retaining ring 26. From the recess 25 on the one side of the fingers 3, the outer sides of the fingers slope gently and evenly outwards to the other end of the fingers, which form a pressure area 27. A locking ring 4 will, when the pipe coupling 1, 2 is locked, lie on the outside of the fingers 3 in the pressure area 27. When the pipe coupling 1, 2 is to be uncoupled, an actuator device (see also FIG. 4) will ensure that the locking ring 4 is moved away from the pressure areas 27 of the fingers 3 and towards the other end of the fingers 3, which will allow the fingers 3 to be move radially out from the first flange 1 (and thus also out of engagement), which means that the pipe coupling can be uncoupled.

At the other end of the second pipe flange 2, that is to say, the end facing towards the pipe 13, there is welded in place a sleeve element 31, said sleeve element 31 forming an attachment for a retaining ring 26 and a base ring 29. The retaining ring 26 and the base ring 29 are fastened to the sleeve element 31 via a screw connection.

A first insulating element 6 is arranged around the second pipe flange 2, so that the first insulating element 6 is fixedly connected to the locking ring 4. This means that the first insulating element 6 and the locking ring 4 will be moved together in the axial direction of the pipe 13 when an actuating tool 40 (see also FIG. 4) is used to move the element 6. The locking ring 4 will thus move away from or in towards the pressure areas 27 of the fingers 3, for coupling or uncoupling of the pipe flanges 1, 2.

In a preferred embodiment, the first insulating element 6, on the side 18 which faces an opposing first pipe flange 1, is configured with a projection 8. The projection 8 is formed of a part conical face 16 which starts in an outer essentially radial face 32 and ends in an inner essentially radial face 17, whereby the projection 8 is arranged towards the centre of the pipe 13.

One or more sealing devices 15 may be arranged in the outer radial face 32, which sealing elements 15, on a slight bending of the pipe coupling, will be able to prevent leakage between the pipe flanges 1, 2.

The first insulating element 6 further comprises, on its outer surface, at least one recess 33, which may extend around the whole of the periphery of the first insulating element 6, or may be in the form of part or point recesses 33. Furthermore, the recess 33 has a (straight) U-shape, but may of course also assume other shapes. The recess 33 is used during the coupling or uncoupling of the pipe coupling, the recess 33 with its shape forming support for an actuating tool 34.

The first insulating element 6 may also be made as a whole sleeve, or it may also be composed of several parts, for example, two semi-circles which together form a whole insulating protection means for the second pipe flange 2. The first insulating element 6 is, in a preferred embodiment, moulded on the element it is to protect. This is done on an installation or the like, before the pipe coupling is lowered to the seabed.

A second insulating element 7 is arranged over a part of the length of the pipe 13. At its end facing the first insulating element 6, the second insulating element 7 is configured with a portion 11 having a smaller outer diameter. This outer diameter corresponds to the inner diameter of the first insulating element 6 so that, when the actuating tool 40 is operated to displace the first insulating element 6, it will be displaced along the portion 11.

The second insulating element 7 may also consist of several parts, for example, two semi-circles which by means of screw connections, quick release couplings adhesive etc. can be put together to form a whole insulating protection means for the pipe 13. However, most expediently, the insulation is moulded in place over a length of the pipe 13.

The second insulating element 7 is further equipped, on its outer surface, with reinforcing rib elements 12 which are intended for mating with sleeve elements 38 on a mounting tool 34. As on the first insulating element 6, there is similarly provided on the outer surface of the second insulating element 7 at least one recess 39, which may extend around the whole periphery of the insulating element 7, or be in the form of part or point recesses 39. The recess 39 has further a (straight) U-shape, but can of course also assume other shapes. The recess 39 is used during coupling or uncoupling of the pipe coupling, the recess 39 with its shape forming support for the actuating tool 40.

In one embodiment, the second insulating element 7 internally, along the whole or parts of its length, may be configured with one or more recesses 19, in which recesses 19, for example, one or more insulating layers are arranged; cf. FIG. 4.

FIG. 3 shows a first pipe flange 1, where the flange in cooperation with the second pipe flange 2 will form a pipe coupling according to the present invention.

Here, the first pipe flange 1 will comprise a shape on the pipe flange which essentially corresponds to the recesses of the fingers 3, so that a secure connection is obtained between the first and the second pipe flange 1, 2.

A third insulating element 5 is arranged on the outside of the first pipe flange 1, which third insulating element 5 is fastened in a suitable manner to the flange 1.

A side 35 of the third insulating element 5 which faces towards the second pipe flange 2 is configured with a recess 9, said recess 9 being complementary with the recess 8 and the gripping element 3 on the said pipe flange 2.

Figure 5:
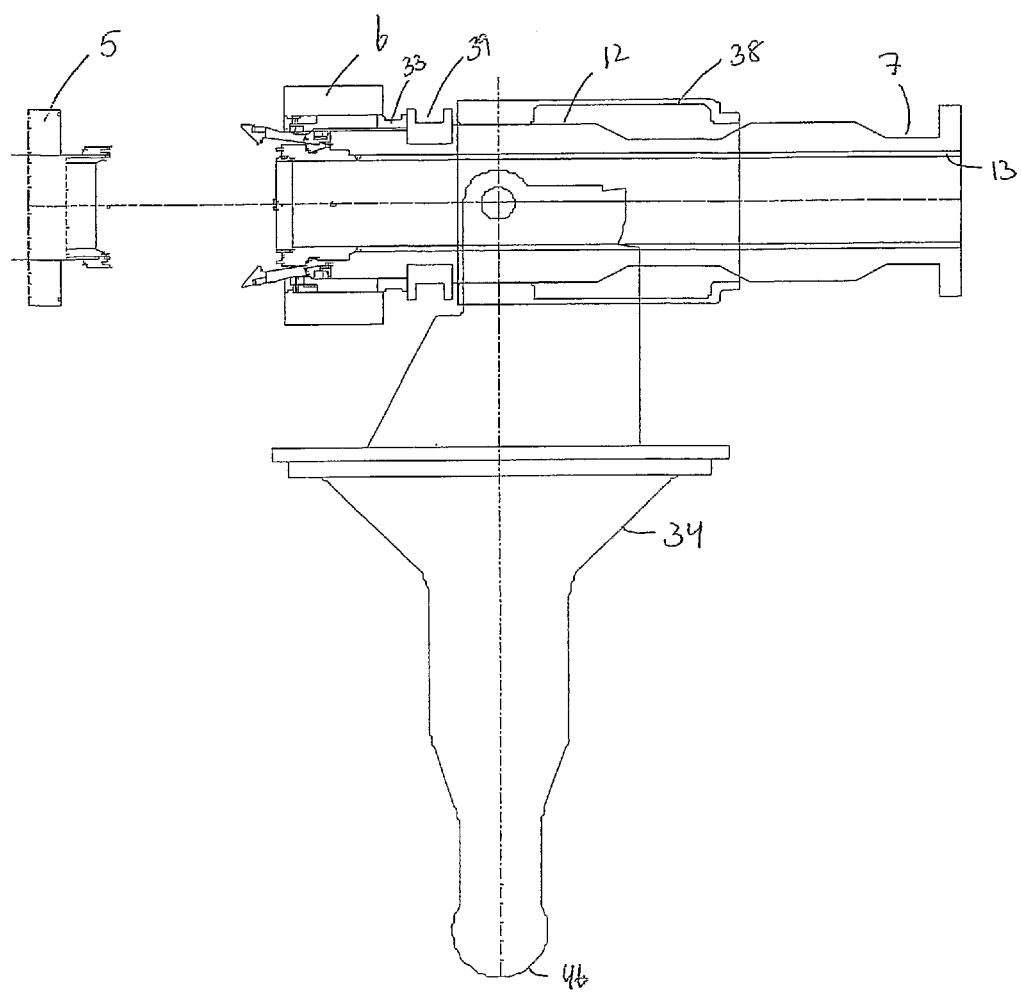
FIGS. 5 and 6 show the coupling process.
Figure 6:
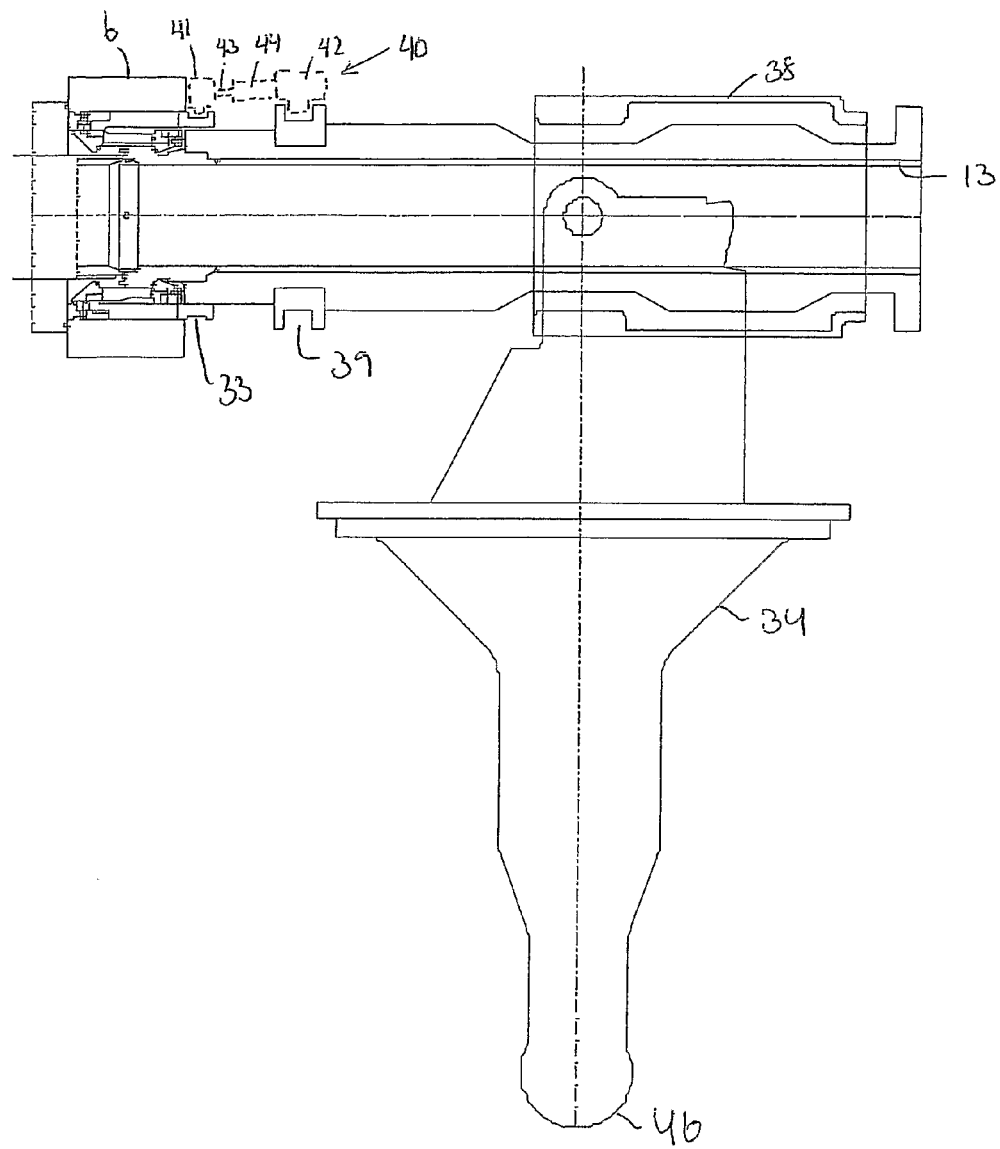

The procedure for installation of a pipeline and connection thereof to the pipe flange 1 is as follows (see FIGS. 5 and 6):

On the surface, i.e., on a ship or platform, the termination head is passed into a mounting tool 34 so that the sleeve element 38 comes to rest against a leg 45 in the recess 39. This ensures that the cooperating faces of the rib element 12 and the sleeve element 38 are in the right position relative to one another to secure the termination head relative to the mounting tool 34. Optionally, locking devices can be provided for locking the parts together temporarily. The termination head, together with the mounting tool 34, is now lowered to the seabed and a pin 46 on the mounting tool 34 is passed into a funnel (not shown) arranged on an installation on the seabed. The termination head is now in approximately the correct axial position for connection (see FIG. 5).

During this phase, the first insulating element 6, and thus the locking ring, is pulled back so that the fingers are open.

With the aid of a suitable tool (not shown), the termination head is now moved towards the flange 1. This means that the faces 12 of the rib elements disengage from the sleeve 38 and the termination head will thus have the freedom to be able to move slightly relative to the mounting tool 34. This is done to avoid undesirable loads on the termination head. At the end of this movement, the pipe flange 2 will be lying against the flange 1 and arranged approximately axially.

Now an actuating tool 40, either with the aid of divers or also by using an ROV, will be connected to the recesses 33 and 39 in the insulating elements 6 and 7, respectively, whereby two yokes 41, 42 engage with the recesses 33, 39. The yokes 41, 42 are connected to a piston 43 and a cylinder 44. By actuating the cylinder 44, the first insulating element 6, and thus also the locking ring 4, is pushed against the first pipe flange 1, this resulting in the fingers 3 being pushed across the pipe flange 1 and engaging with the pipe flange 1.

The invention claimed is:

1. A pipe coupling apparatus for coupling together first and second opposing pipe flanges, the pipe coupling apparatus comprising:
    a number of gripping elements which are connected to the second pipe flange and are engageable with the first pipe flange,
    at least one locking element which is displaceably arranged on the second pipe flange to lock the gripping elements to the first pipe flange when the pipe flanges are coupled together,
    a first insulating element which extends around the second pipe flange and is connected to the locking element, and
    an actuating tool for displacing the first insulating element and thus the locking element.

2. The pipe coupling apparatus according to claim 1, wherein the first insulating element comprises an axial projection which includes a conical face that converges radially inwardly to a radial face.

3. The pipe coupling apparatus according to claim 2, further comprising a third insulating element which extends around the first pipe flange and which comprises a recess within which both the gripping elements and the projection are accommodated when the pipe flanges are coupled together.

4. The pipe coupling apparatus according to claim 1, further comprising at least one sealing device which is arranged in a side of the first insulating element facing the first pipe coupling.

5. The pipe coupling apparatus of claim 1, further comprising a second insulating element which extends around at least a portion of a pipe which is connected to the second pipe flange.

6. The pipe coupling apparatus according to claim 5, wherein the tool comprises a first part which is connected to the first insulating element, a second part which is connected to the second insulating element, and an actuator which is connected to the first and second parts.

7. The pipe coupling apparatus according to claim 5, wherein the second insulating element comprises a reduced diameter portion which fits within an adjacent portion of the first insulating element.

8. The pipe coupling apparatus according to claim 5, wherein the second insulating element comprises means for connecting the second pipe flange to a mounting tool.

9. The pipe coupling apparatus according to claim 5, wherein the second insulating element comprises one or more internal, axially extending recesses within which one or more insulating layers are provided.

10. The pipe coupling apparatus according to claim 5, wherein the first and second insulating elements are molded on at least one of the second pipe flange and the pipe.

11. A pipe coupling apparatus comprising:
first and second pipe flanges,
a pipe which is connected to one of the pipe flanges,
means for coupling together the two pipe flanges, and
at least one insulating element which extends around the pipe, the insulating element comprising load-bearing and force-transmitting properties and means to which an actuating tool may be attached.

12. A pipe coupling apparatus comprising:
first and second pipe flanges,
a pipe which is connected to one of the pipe flanges,
means for coupling together the two pipe flanges, and
at least one insulating element which extends around the pipe, the insulating element comprising load-bearing and force-transmitting properties and means for attaching the pipe to a structure.

* * * * *